(12) United States Patent
Bärnthaler et al.

(10) Patent No.: US 12,096,707 B2
(45) Date of Patent: Sep. 24, 2024

(54) CUTTING ELEMENT

(71) Applicant: BOEHLERIT GmbH & Co.KG., Kapfenberg (AT)

(72) Inventors: Walter Bärnthaler, St. Marein im Mürztal (AT); Hannes Burböck, Kindberg/Aumühl (AT)

(73) Assignee: BOEHLERIT GmbH & Co.KG., Kapfenberg (AT)

( * ) Notice: Subject to any disclaimer, the term of this patent is extended or adjusted under 35 U.S.C. 154(b) by 965 days.

(21) Appl. No.: 16/904,960

(22) Filed: Jun. 18, 2020

(65) Prior Publication Data
US 2021/0007263 A1  Jan. 14, 2021

(30) Foreign Application Priority Data

Jun. 19, 2019 (AT) .............................. A 50553/2019

(51) Int. Cl.
*A01B 23/02* (2006.01)
*A01B 15/06* (2006.01)
(Continued)

(52) U.S. Cl.
CPC .............. *A01B 23/02* (2013.01); *A01B 15/06* (2013.01); *A01B 15/18* (2013.01); *A01B 35/26* (2013.01)

(58) Field of Classification Search
CPC ......... A01B 15/02; A01B 15/18; A01B 15/06; A01B 35/26; B23D 61/121
See application file for complete search history.

(56) References Cited

U.S. PATENT DOCUMENTS 122,885 A * 1/1872 Glenn .................... A01B 35/26
172/722
139,750 A * 6/1873 Zocher .................. A01B 35/26
172/724
(Continued)

FOREIGN PATENT DOCUMENTS

AT         16266      5/2019
DE         488478     12/1929
(Continued)

OTHER PUBLICATIONS

Austria Search Report conducted in Austria Appln. No. A 50553/2018 (Oct. 22, 2019).
(Continued)

*Primary Examiner* — Jessica H Lutz
(74) *Attorney, Agent, or Firm* — GREENBLUM & BERNSTEIN, P.L.C.

(57) ABSTRACT

Cutting element made of cemented carbide for an agricultural soil cultivation tool for cutting into the earth, which includes a top side and a bottom side, a front side, a back side opposite of the front side, and at least one lateral surface. The top and bottom sides are connected via the front side, back side, and the at least one lateral surface. The front side includes a cutting region having multiple teeth, and at least one tooth is formed with a first flank and a second flank. To achieve an efficient cutting into the earth with a complete cut through the weeds or herbaceous plants present in the earth, a profile line of the first flank and a profile line of the second flank have different lengths. In this manner, weeds are completely severed and killed, whereby use of sprays for killing weeds is reduced to protect the environment.

19 Claims, 3 Drawing Sheets

Figure 1A:
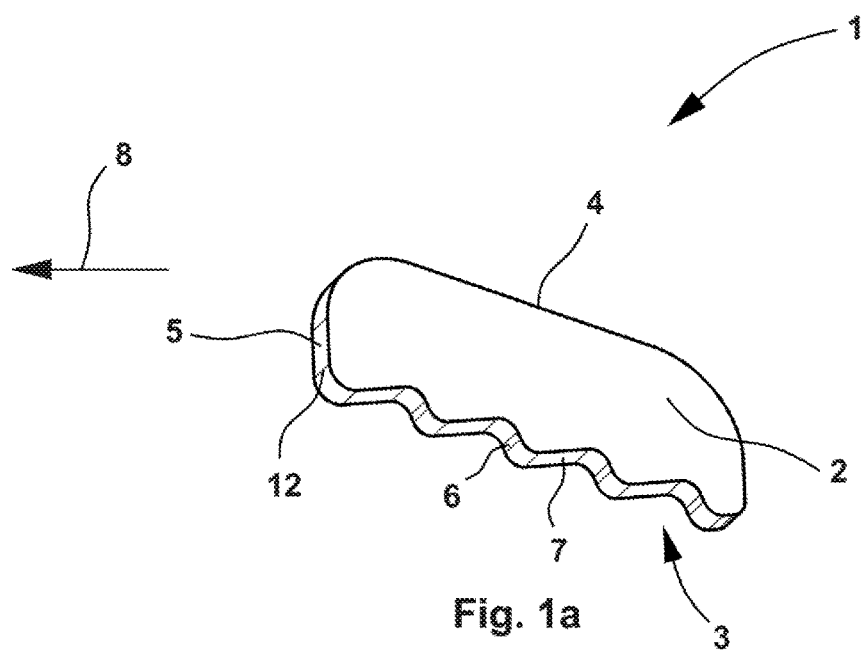

(51) Int. Cl.
    *A01B 15/18*     (2006.01)
    *A01B 35/26*     (2006.01)

(56) References Cited

U.S. PATENT DOCUMENTS

| | | | | |
|---|---|---|---|---|
| 397,415 | A * | 2/1889 | Cadwell et al. | A01B 15/02 |
| | | | | 172/737 |
| 486,021 | A * | 11/1892 | Battle | A01B 35/26 |
| | | | | 172/746 |
| 956,768 | A * | 5/1910 | Jauer | A01B 35/26 |
| | | | | 172/720 |
| 7,806,033 | B2 * | 10/2010 | Kocher | B23D 61/128 |
| | | | | 83/849 |
| 8,186,611 | B1 * | 5/2012 | Boer | A01K 5/001 |
| | | | | 241/294 |
| 11,044,852 | B2 * | 6/2021 | Kooima | B02C 18/18 |
| 2019/0230838 | A1 * | 8/2019 | Baernthaler | A01B 35/225 |
| 2020/0267897 | A1 * | 8/2020 | Burböck | A01D 25/005 |
| 2021/0185872 | A1 * | 6/2021 | Bärnthaler | A01B 15/06 |

FOREIGN PATENT DOCUMENTS

| | | | |
|---|---|---|---|
| DE | 1938051 | 1/1971 | |
| DE | 202018000434 | 2/2018 | |
| EP | 3516938 | 7/2019 | |
| EP | 3701781 | 9/2020 | |
| GB | 157641 A * | 1/1921 | ............. A01B 35/26 |
| WO | WO-0242028 A1 * | 5/2002 | ........... B23D 61/021 |

OTHER PUBLICATIONS

Europe Search Report/Office Action conducted in Europe Appln. No. EP 20179246 (Nov. 12, 2020).

European Search Report/Office Action conducted in counterpart Europe Appln. No. 20179246.2-1004 (Nov. 12, 2020).

Austria Search Report conducted in Austria Appln. No. A 50553/2019 (Oct. 22, 2019).

Europe Office Action conducted in Europe Appln. No. EP 20179246 (May 26, 2023).

* cited by examiner

CUTTING ELEMENT

CROSS-REFERENCE TO RELATED APPLICATIONS

The present application claims priority under 35 U.S.C. § 119 of Austrian Patent Application No. A 50553/2019, filed Jun. 19, 2019, the disclosure of which is expressly incorporated by reference herein in its entirety.

The invention relates to a cutting element made of cemented carbide for an agricultural soil cultivation tool for cutting into the earth, comprising a top side and a bottom side as well as a front side, a back side opposite of the front side, and at least one lateral surface, wherein the top side and bottom side are connected via the front side, back side, and the at least one lateral surface and the front side comprises a cutting region having multiple teeth, wherein at least one tooth is formed with a first flank and a second flank.

The invention furthermore relates to a use of a cutting element of this type.

In agriculture, adequate soil preparation prior to sowing is critically important for achieving a good crop yield. A complete cut through the earth using sweeps or the like, with a cut through weeds or herbaceous plants, is necessary since the weeds or herbaceous plants can continue to grow in the case of an incomplete cut. A complete cut through the weeds or herbaceous plants loosens up the earth. Where the earth is compacted, on the other hand, rainwater can then no longer be sufficiently absorbed by the earth and the supply of groundwater to the roots of the crops is also limited as a result.

For soil preparation, soil cultivation tools are used which are pulled by a tractor and with which cuts are made into the earth. In this manner, the earth is separated and, in particular, weeds or herbaceous plants are severed. To increase a wear resistance of the soil cultivation tools made of steel, it is known from the prior art that the cutting-active regions of the soil cultivation tools are equipped with cutting elements of cemented carbide.

According to the prior art, wear-resistant cutting elements made of cemented carbide are known for this purpose, which cutting elements can be inserted into a groove on a base body and soldered-on. The cutting elements are normally embodied in a plate-like shape with straight cutting edges. The cutting regions of the cutting elements known from the prior art are disadvantageous in that the weeds that are to be cut can move out of the way and slide past at the straight cutting edges, and there is thus no, or only an incomplete, cut through the earth. There is thus a need for cutting elements that ensure the complete cut through the weeds or herbaceous plants and through the earth.

The object of the invention is to specify a cutting element of the type named at the outset with which an efficient cutting into the earth with a complete cut through the weeds or herbaceous plants present can be achieved.

Furthermore, a use of a cutting element of this type is to be specified.

The first object is achieved according to the invention in that, with a cutting element of the type named at the outset, a profile line of the first flank and a profile line of the second flank have different lengths.

One advantage obtained with the invention can in particular be seen in that an efficient catching and severing of weeds or herbaceous plants are enabled by the special design of the teeth of the cutting region on the cutting element. In this manner, the complete cut through the earth is achieved, whereby rainwater and also groundwater can reach the roots of the crops unimpeded, and a good crop yield can be obtained as a result.

An ecological advantage of the complete cut through weeds is that the weeds are killed in this manner, and therefore considerably less spray must be used to kill weeds. This contributes greatly to protecting the environment. A further advantage of a cutting element according to the invention is that the cutting element is formed from cemented carbide. This increases the wear resistance of the cutting elements and thus extends the service life thereof on the soil cultivation tool.

It has proven effective that the first flank of the at least one tooth is arranged behind the second flank of the at least one tooth in a working direction. In this manner, weeds impacting the cutting element can be severed at the first flank. If this cannot be achieved due to an angle of impact by the weeds on the cutting element that is unfavorable for a complete cut, or because of the amount of weeds, the weeds can be severed in the subsequent second flank of the tooth. If the weeds or herbaceous plants slide past or move out of the way at the first tooth, there is another possibility of a cut at the next tooth, which is repeated multiple times. It is thus achieved that the weeds or herbaceous plants are at least extensively cut-through.

Preferably, in a plan view, the second flank forms and angle of 0° to 60°, preferably 2° to 45°, in particular 5° to 15°, with an imaginary plane which lies parallel to the front side. A controlled severing of weeds or herbaceous plants at the second flank can thus be achieved. If the weeds or herbaceous plants cannot be cut completely at the second flank, for example due to the amount thereof, they are passed on via the second flank to a subsequent tooth, where they can be cut.

It is advantageous if the second flank of the at least one tooth is arranged at an angle of 60° to 120°, preferably 70° to 110°, in particular 90°, to the first flank of a subsequent tooth. As a result, an angle is formed between the first and second tooth at which the weeds that were not cut, or were cut incompletely, by the first tooth, can be caught and severed by the first flank of the subsequent tooth.

Optionally, the profile line of the second flank of the tooth is more than 1.1 times, at least twice, in particular five times, as long as the profile line of the first flank of the at least one tooth. Due to this toothing, the first and shorter flank of the tooth can become active, primarily for catching and also already for severing the weeds or herbaceous plants.

Expediently, the cutting region comprises two to ten, preferably three to five, in particular four, teeth. As a result, the severing of weeds that may potentially slide past is ensured, since especially a larger amount of weeds must be caught and severed at multiple positions, for example, for which reason an array of multiple teeth is advantageous.

Preferably, a length of the cutting element is at least equally long, preferably twice as long, in particular three times as long, as a width of the cutting element, and it is advantageous if the length of the cutting element is at least equally long, preferably five times as long, in particular twenty times as long, as a height of the cutting element. Thus, an active cutting region arranged along the length of a cutting element can be extended while simultaneously reducing the material cost for the body of the cutting element as a result of the reduced width and reduced height of the cutting element as compared to the length.

The other object is attained in that a cutting element for an agricultural soil cultivation tool according to the invention is used to cut into the earth.

One advantage of such a use results from the fact that, with the soil cultivation tool that comprises at least one cutting element according to the invention, an efficient cut into the earth is achieved, whereby good soil cultivation can be realized. In particular, this is achieved in that multiple cutting elements are arranged along an edge of a soil cultivation tool. In addition, the service life of the soil cultivation tool is extended by the use of a cemented carbide for the cutting elements.

In the case of a soil cultivation tool for agriculture, in particular for the preparatory cultivation of agricultural land, it is beneficial if this tool comprises at least one cutting element according to the invention. Particularly due to the arrangement of multiple cutting elements, the efficient severing of weeds and thus an efficient soil cultivation are ensured.

It is advantageous if, on a base body, at least first cutting elements arranged in separate seats are arranged along a working edge. In this manner, it is possible to position the cutting elements before they are soldered-on, wherein each cutting element can be positioned individually because of the separate seats. Furthermore, during cultivation of the earth, a force acting on the cutting element is not transferred to the other cutting elements.

In addition, it can be beneficial if, in a plan view of the base body, the first cutting elements are arranged offset from one another in a recessed manner along the working edge, at least in sections. In this manner, it is possible to achieve a theoretical overlap of the cutting elements in a working direction, and to thus bridge the gap between the arranged cutting elements. A planar cut through the earth can thus be achieved. A further advantage occurs in that, due to an offset arrangement, the cutting elements become active on different planes and the weeds can thus be cut-through efficiently according to the direction and angle of impact on the soil cultivation implement.

Preferably, the seats of the soil cultivation tool comprise a stop for positioning the first cutting elements, whereby a precise positioning of the cutting elements on the seats and thus on the base body of the soil cultivation tool can be achieved.

An ease of production for the seats of the soil cultivation tool can be achieved with milling. As a result, a rapid and efficient fabrication of the soil cultivation tool is possible, since the cutting elements can be soldered-on immediately following the milling.

To reduce the cost of the soil cultivation tool, the base body can be at least partially made of steel. A further advantage of a fabrication of the base body from steel is a simple further workability of the base body, for example in terms of milling the seats of the cutting elements.

Basically, the base body can have any desired shape. For efficient cutting into the earth, the base body of the soil cultivation tool is preferably embodied to be essentially V-shaped in a plan view. As a result, two frontal edges of the base body can function in a cutting-active manner.

Optionally, the first cutting elements are positioned at an angle of 20° to 50°, preferably 25° to 35°, to a base area of the base body of a soil cultivation tool. As a result, the desired cutting performance is obtained with a beneficial wedge angle, while wear of the cutting elements can be minimized at the same time.

In addition, it can be beneficial if regions of the cutting edges are arranged at the same height and/or behind one another along the working edge of the soil cultivation tool, whereby a continuous and planar cut into the earth is efficiently achieved.

It can be advantageous if cartridges are provided on the base body of the soil cultivation tool, on which cartridges the cutting elements are arranged, wherein the cartridges are preferably made of a steel. The advantage that follows therefrom is, on the one hand, that the base body is protected in this manner against wear and, on the other than, that when the cartridges are worn, they can be replaced individually, and therefore the entire base body does not need to be replaced in the event of localized wear. In this manner, a long service life of the soil cultivation tool is achieved and maintenance of the same can be performed easily and cost-effectively.

Figure 1B:
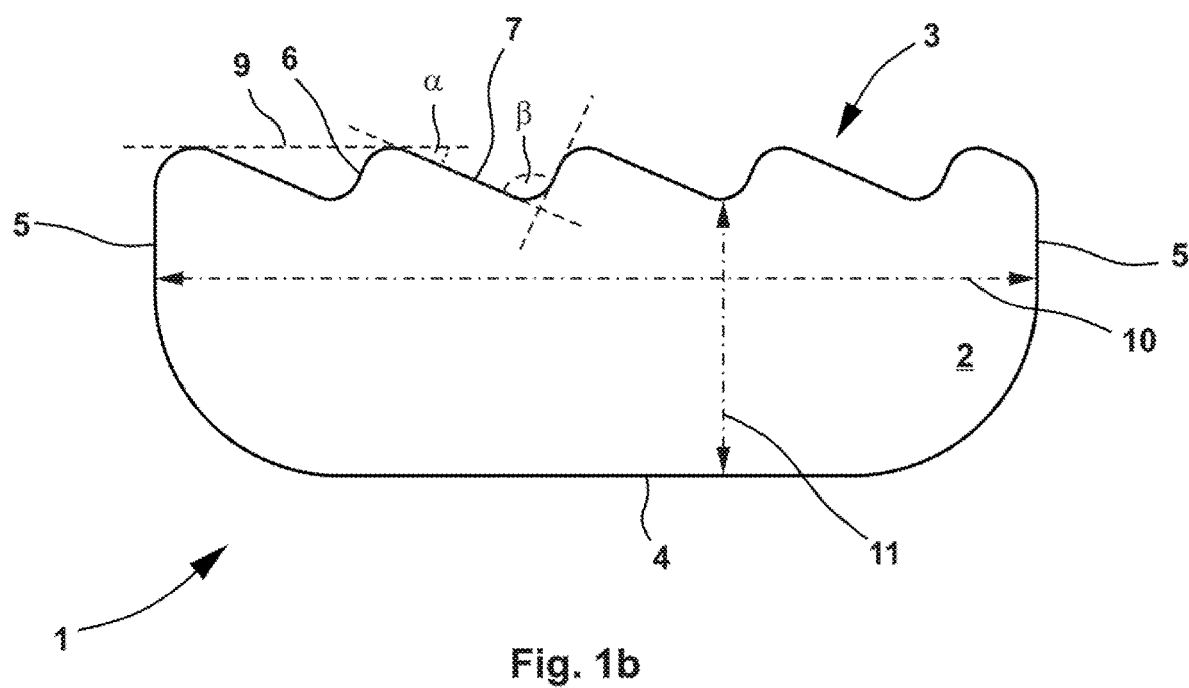
Figure 2:
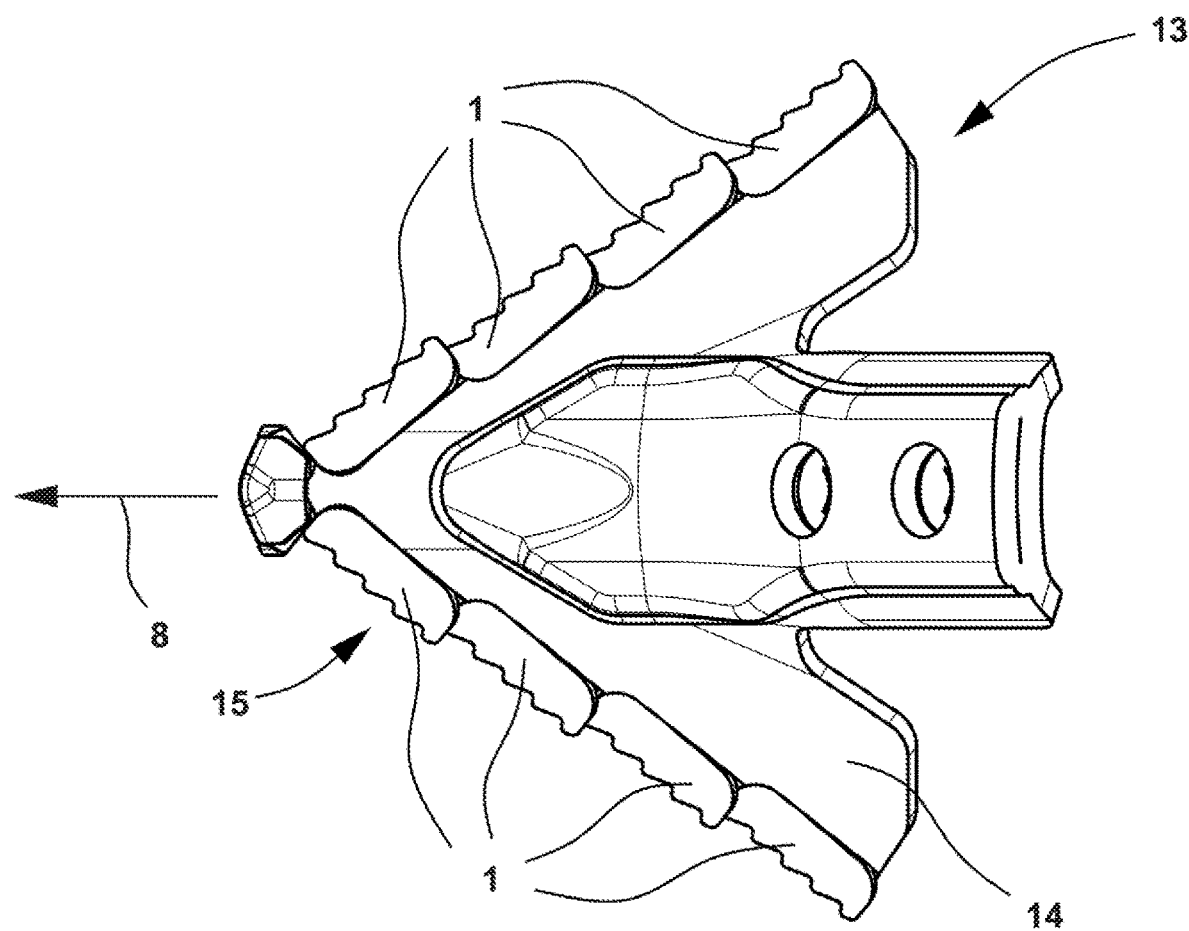
Figure 3A:
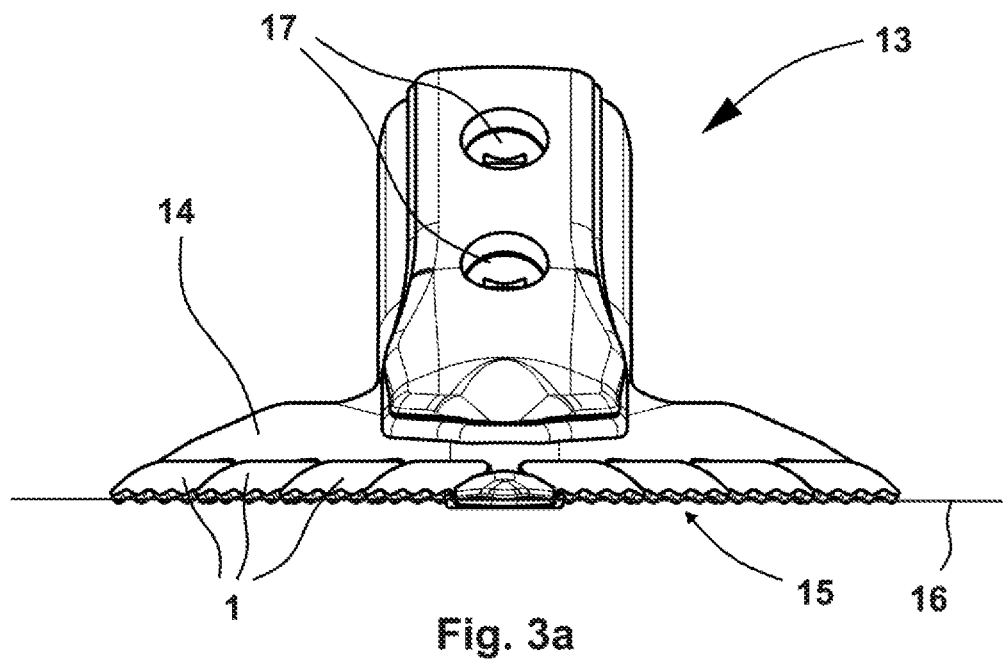
Figure 3B:
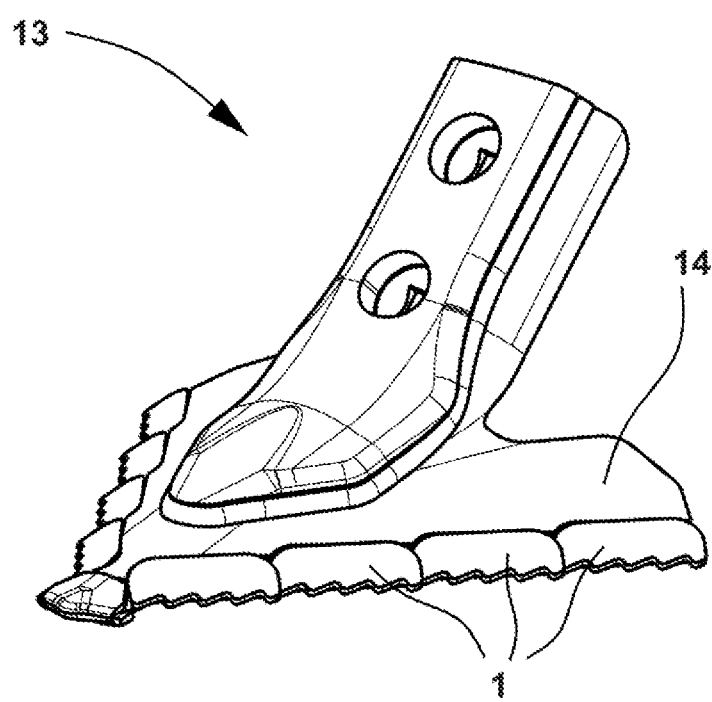

Additional features, advantages and effects follow from the exemplary embodiments described below. The drawings which are thereby referenced show the following:

FIG. 1a A schematic perspective illustration of a cutting element according to the invention made of cemented carbide for an agricultural soil cultivation tool for cutting into the earth;

FIG. 1b A plan view of a cutting element according to FIG. 1;

FIG. 2 A plan view of a soil cultivation tool according to the invention for agriculture;

FIG. 3a A frontal view of the soil cultivation tool according to FIG. 2;

FIG. 3b A perspective illustration of a soil cultivation tool according to FIG. 2.

FIG. 1a shows a schematic and perspective illustration of a cutting element 1 made of cemented carbide for an agricultural soil cultivation tool 13 for cutting into the earth. The cutting element 1 comprises a top side 2, a bottom side opposite of the top side 2 and not visible in this illustration, a back side 4, a front side 3 opposite of the back side 4, and two lateral surfaces 5, wherein one of the two lateral surfaces 5 is hidden in this illustration by the top side 2. Furthermore, it can be seen that the front side 3 comprises a cutting region having multiple teeth, wherein each tooth respectively comprises a first flank 6 and a second flank 7. The first flank 6 is arranged in front of the second flank 7 of a tooth in a working direction 8. Additionally, a height 12 of the cutting element 1 is indicated.

FIG. 1b shows a plan view of the cutting element 1 made of cemented carbide, wherein the view is limited to the top side 2, which is bounded by two lateral surfaces 5, the back side 4, and the front side 3 opposite of the back side 4. The dimensions of the cutting element 1 in a plan view are composed of a length 10 and a width 11 of the cutting element 1, wherein the length 10 is approximately three times as long as the width 11 and approximately twenty times as long as the height 12 of the cutting element 1. On the front side 3, a cutting region having multiple teeth is arranged, wherein in the exemplary embodiment illustrated, a profile line of the second flank 7 is approximately twice as long as a profile line of the first flank 6. Additionally, in the exemplary embodiment illustrated, the second flank 7 forms an angle a of approximately 22° with an imaginary plane 9 that lies parallel to the front side 3, and the second flank 7 of the tooth forms an angle β, which has a value of approximately 90° in the exemplary embodiment illustrated, with the first flank 6 of a subsequent tooth.

In FIG. 2, a plan view of a soil cultivation tool 13 for agriculture for the purpose of cutting into the earth is illustrated. The illustrated soil cultivation tool 13 comprises a base body 14 made of steel, which body can basically have any shape and can be embodied in one or more pieces. Furthermore, the base body 14 comprises two lateral wings and is essentially embodied in a V shape in the plan view, wherein both sides of the V-shaped base body 14 are arranged facing a working direction 8 and are embodied as working edges 15. On each working edge 15, four cutting elements 1 according the invention are respectively positioned which are embodied as cutting inserts made of cemented carbide and are arranged offset from one another in a recessed manner in separate seats. The seats respectively comprise a stop, whereby the cutting inserts can be easily positioned and a separate dissipation of force from the individual cutting inserts to the base body 14 is enabled.

In FIG. 3*a*, a frontal view of the soil cultivation tool 13 is illustrated. It can thereby be seen that cutting elements 1 according to the invention arranged on a base body 14 are positioned at an angle of approximately 30° to a base area 16 of the base body 14. Furthermore, two openings 17 are arranged on the base body 14, via which openings 17 the base body 14 can be attached indirectly or directly to a tractor, for example. In addition, it can be seen in FIG. 3*a* that, through the selected arrangement of the cutting inserts on the base body 14, a continuous cutting edge is achieved on the working edge 15 of the base body 14. A planar and continuous cut into the earth can thus be carried out with the soil cultivation tool 13.

In FIG. 3*b*, a perspective view of the soil cultivation tool 13 can be seen, wherein the cutting elements 1 are arranged on the base body 14.

The special design of the teeth in the cutting region along the front side 3 of the cutting element 1 enables a particularly efficient severing of weeds as well as an improved, continuous cutting into the earth. Thus, through the use of a cutting element 1 according to the invention for an agricultural soil cultivation tool 13, an efficient and suitable soil cultivation can be achieved by preventing a compaction of the soil prior to sowing in order to obtain a good crop yield. In addition, through the complete severing of weeds or herbaceous plants, whereby said weeds or herbaceous plants are killed, a use of sprays can be significantly reduced. The environment is thus protected to a considerable degree.

The invention claimed is:

1. A cutting element made of cemented carbide for an agricultural soil cultivation tool for cutting into the earth, comprising:
   a top side and a bottom side as well as a front side, a back side opposite of the front side, and at least one lateral surface,
   wherein the top side and bottom side are connected via the front side, back side, and the at least one lateral surface and the front side comprises a cutting region having multiple teeth,
   wherein at least one tooth is formed with a first flank and a second flank, and
   wherein a profile line of the first flank and a profile line of the second flank have different lengths.

2. The cutting element according to claim 1, wherein the first flank of the at least one tooth is arranged behind the second flank of the at least one tooth in a working direction.

3. The cutting element according to claim 1, wherein, in a plan view, the second flank forms an angle ($\alpha$) of 0° to 60°, 2° to 45°, or 5° to 15° with an imaginary plane which lies parallel to the front side.

4. The cutting element according to claim 1, wherein the second flank of the at least one tooth is arranged at an angle ($\beta$) of one of 60° to 120°, 70° to 110°, in particular 90°, to the first flank of a subsequent tooth.

5. The cutting element according to claim 1, wherein the profile line of the second flank of the tooth is more than 1.1 times, at least twice, or five times as long as the profile line of the first flank of the at least one tooth.

6. The cutting element according to claim 1, wherein the cutting region comprises one of: two to ten, three to five, or four teeth.

7. The cutting element according to claim 1, wherein a length of the cutting element is one of: at least equally long, twice as long, or three times as long as a width of the cutting element.

8. The cutting element according to claim 7, wherein the length of the cutting element is one of: at least equally long, five times as long, or twenty times as long as a height of the cutting element.

9. A method of cutting into the earth using a cutting element according to claim 1 for an agricultural soil cultivation tool for cutting into the earth, comprising:
   connecting the cutting element to a base body of the agricultural soil cultivation tool, wherein the back side of the cutting element is arranged at an angle of about 30° to a working direction of the agricultural soil cultivation tool, and
   inserting the cutting element into the earth in the working direction of the agricultural soil cultivation tool.

10. A soil cultivation tool for agriculture for preparatory cultivation of agricultural land, comprising one or more cutting elements according to claim 1.

11. The soil cultivation tool according to claim 10, further comprising a base body including one or more seats arranged along a working edge, wherein, on the base body, each of the one or more cutting elements is arranged in a respective one of the one or more seats.

12. The soil cultivation tool according to claim 11, wherein the one or more cutting elements comprise a plurality of cutting elements and, in a plan view of the base body, the plurality of cutting elements are arranged offset from one another in a recessed manner along the working edge, at least in sections.

13. The soil cultivation tool according to claim 11, wherein the one or more seats comprise stops for positioning the one or more cutting elements.

14. The soil cultivation tool according to claim 11, wherein the seats are created by milling.

15. The soil cultivation tool according to claim 11, wherein the base body is at least partially made of a steel.

16. The soil cultivation tool according to claim 11, wherein the base body is embodied in a V shape in a plan view.

17. The soil cultivation tool according to claim 11, wherein the first cutting elements are positioned at an angle of 20° to 50°, or 25° to 35°, to a base area of the base body.

18. The soil cultivation tool according to claim 11, wherein regions of the cutting edges are arranged at the same height and/or behind one another along the working edge.

19. The soil cultivation tool according to claim 11, wherein cartridges are provided on the base body, on which cartridges the one or more cutting elements are arranged, wherein the cartridges are made of a steel.

* * * * *